(12) United States Patent
Tognazzini

(10) Patent No.: US 6,600,713 B1
(45) Date of Patent: Jul. 29, 2003

(54) RECORDING MEDIA HAVING SEPARATE READ ONLY AND READ/WRITE AREAS

(75) Inventor: Bruce Tognazzini, Woodside, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/672,511

(22) Filed: Jun. 26, 1996

(51) Int. Cl.7 .................................................. G11B 7/24
(52) U.S. Cl. ........................ 369/275.1; 369/275.3; 369/111
(58) Field of Search ................ 369/14, 13, 275.2, 369/275.3, 275.4, 32, 33, 83, 50, 56, 58, 111, 286, 275.1, 100, 133, 260, 47.41, 47.55, 30.11; 4/4; 368/84

(56) References Cited

U.S. PATENT DOCUMENTS

| 4,802,021 A | * | 1/1989 | Makagawa et al. | 360/59 X |
|---|---|---|---|---|
| 5,153,861 A | * | 10/1992 | Maeda et al. | 369/32 |
| 5,214,627 A | * | 5/1993 | Nakashima et al. | 369/32 |
| 5,237,547 A | * | 8/1993 | Ohkuma et al. | 369/13 |
| 5,537,387 A | * | 7/1996 | Ando et al. | 369/275.1 |
| 5,566,144 A | * | 10/1996 | Shinada | 369/32 |
| 5,812,519 A | * | 9/1998 | Kawamura et al. | 369/275.1 |
| 5,815,333 A | * | 9/1998 | Yamamoto et al. | 360/60 |
| 5,825,728 A | * | 10/1998 | Yoshimoto et al. | 369/32 |
| 5,835,479 A | * | 11/1998 | Miyagawa et al. | 367/275.2 |
| 5,959,946 A | * | 9/1999 | Tognazzini | 369/32 |
| 6,031,808 A | * | 2/2000 | Ueno | 369/111 |
| 6,103,407 A | * | 8/2000 | Izumi et al. | 428/694 ML |

* cited by examiner

Primary Examiner—Ali Neyzari
(74) Attorney, Agent, or Firm—Finnegan, Henderson, Farabow, Garrett & Dunner, L.L.P.

(57) ABSTRACT

A hybrid optical recording medium is arranged to allow original information that is pre-recorded in a mass manufacturing process to be supplemented by additional information written to the disk after the original information has been recorded using a disk drive. The medium contains a first optical area for storing information which is pre-recorded according to a highly structured standard format and a second optical area in which supplemental information can be written, read back therefrom, erased and changed by a computer connected to the disk drive.

5 Claims, 4 Drawing Sheets

RECORDING MEDIA HAVING SEPARATE READ ONLY AND READ/WRITE AREAS

BACKGROUND OF THE INVENTION

1. Field of the Invention

The invention relates generally to optical recording media such as for example, digital video disks (DVDs), compact disks (CDs) and compact disk read only memories (CD-ROMs). More particularly, the present invention relates to optical recording media having both a mainly read-only part containing information recorded in a manufacturing process and a read/write part in which information can be written, erased, changed and read subsequent to the manufacturing process.

2. Description of the Related Art

Current read-only optical technology enables large amounts of information to be permanently stored on a relatively small optical medium. However, it has a problem that the original information cannot be changed and additional information cannot easily be written to the disk after original information has been recorded in a manufacturing process. Furthermore, the original information is usually pre-recorded in a standard format which cannot be changed. Read/write optical technology is developing but is not widely in use.

A conventional read-only CD typically contains a plurality of different songs recorded at once on a large number of CDs in a mass manufacturing process. Programmable CD players are available which can be programmed by a user to read and play only selected ones of the songs on a CD and to play the selected songs in a certain order according to a user's personal tastes. The program is stored in a memory within a CD player. However, if the CD is played in another CD player, then the user has to program that other CD player as well. And if a CD player cannot distinguish between different CDs and the user wishes to have a customized program for each one of the different CDs, they then have to reprogram the CD player each time a different CD is put into the player.

Some CD players may be configured so that they can detect and distinguish between CDs on the basis of information, such as serial number or code number, recorded on the CDs during the manufacturing process, store customized programs keyed to respective corresponding one of the CDs, and execute the customized program corresponding to an identified CD. Even so, because the customized program is stored in a memory of the CD player, if the CD player becomes inoperable, loses power or suffers a power surge, or if the memory fails for any reason, then the program is irretrievably lost and the user again has to reprogram the CD player. Such reprogramming is especially time consuming if the CD player is a jukebox type CD player containing, for example, a number of different programs for a large number of different CDs.

Of course, machines such as DVD players or personal computers may also be configured to accept a number of different types of customizations keyed to corresponding CDs besides playback programs. For example, the machines may be customized to display the title, artist or other information related to a song to be played or other information to be read from the recording medium. Since conventional read-only optical disks contain information recorded in accordance with a highly structured standard format, it is not possible to add such supplementary information to the disk. Therefore, even through optical recorders are available which can write onto optical recording mediums, they cannot be used to record additional information onto media already having pre-recorded information recorded according to a highly structured standard format in a manufacturing process.

SUMMARY OF THE INVENTION

The present invention provides a hybrid optical recording medium which allows original information that is pre-recorded in a manufacturing process to be supplemented by additional information written to the disk after the original information has been recorded. A key feature of the medium is that it contains a first area for storing information which is pre-recorded according to a highly structured standard format and a record area in which information can thereafter be written, read back therefrom, erased and changed by a user.

In accordance with a preferred embodiment of the invention, an optical disk is used which is similar to a conventional DVD, CD or CD-ROM disk and contains information recorded according to a standard read-only format except that a read/write area is also provided somewhere on the disk. A disk drive apparatus is configured to read the information recorded according to the standard read-only format and to read, write, erase and change information in the read/write area. The disk drive apparatus is preferably an integral part of an information processing system. A controller of the disk drive apparatus interacts with a processor of the information processing system. The read/write area is utilized according to instructions from the processor.

The advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in the same or other fields, which are within the scope of the invention as disclosed and claimed herein and with respect to which the invention could be of significant utility.

NOTATION AND NOMENCLATURES

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose, such as CD player or DVD player, or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENTS

Figure 1A:
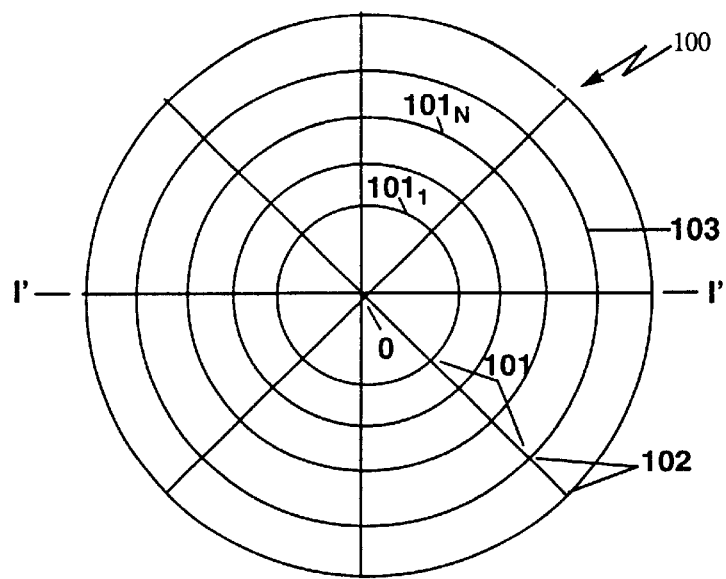
FIG. 1A is an illustrative dimensional view of one embodiment of a hybrid optical disk recording medium in accordance with the present invention.

One embodiment of the hybrid optical disk recording medium in accordance with the invention will now be described with reference to FIGS. 1A and 1B. As shown in FIG. 1A, the disk 100 has an optical read-only part 101 made up of a plurality of circular tracks $101_1$ to $101_N$, each one of which is divided into a number of sectors by radial lines extending from the center O of the disk. Each one of the tracks can have the same number of sectors, in which case the size of the sectors is larger for tracks near the circumference of the disk, or the number of sectors can vary with the size of the sectors remaining constant. Information is pre-recorded in read-only part 101 in accordance with a standard read-only format.

A separate recording area 103 is positioned beyond the outermost track of the read-only part 101 and comprises a magnetic read/write part 102 of the disk. Preferably, the read/write part 102 is composed of only a single track, however it may be composed of as many tracks as desired. Separate recording area 103 may be divided into the same number of sectors as tracks $101_1$ to $101_N$ or a larger number. While the size of the read/write part 102 will necessarily depend upon its use, it is anticipated that a relatively small amount of information would need to be written in read/write part 102 and that therefore its size will be small relative to the size of read-only part 101. Magnetic read/write part 102 is also preferably simpler and lower in density and cost than optical read-only part 101. Information can be written in accordance with a standard or nonstandard format.

Figure 1B:
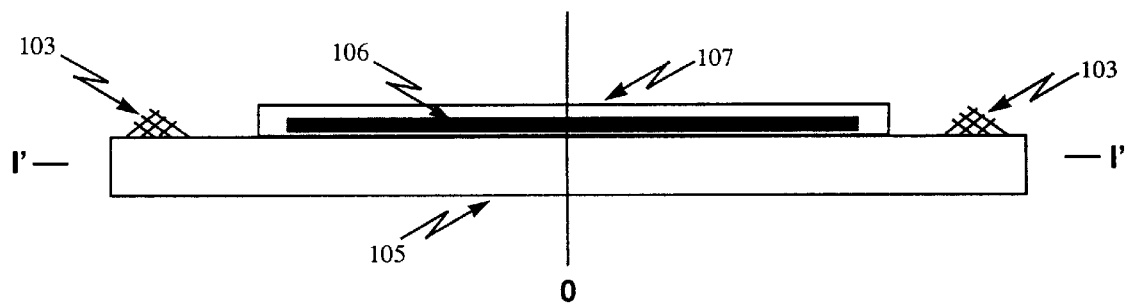
FIG. 1B is a cross-sectional view of said one embodiment of a hybrid optical disk recording medium in accordance with the present invention taken along line I'—I' of FIG. 1A.

FIG. 1B shows a cross section of disk 100 along line I'—I'. The disk is composed of a substrate 105, an optical layer 106 containing tracks $101_1$ to $101_N$, and a translucent finishing layer 107. The finishing layer 107 is coated on at least layer 106 of read-only part 101 in order to protect it. The circular track(s) of read/write part 102 may be deposited directly on substrate 105, on layer 107 or on some other layer suitable as a base for magnetic recording. While read/write part 102 is composed of a circular track(s) on a rotating disk in the preferred embodiment of the invention, one or more linear track(s) may be used instead.

Figure 2:
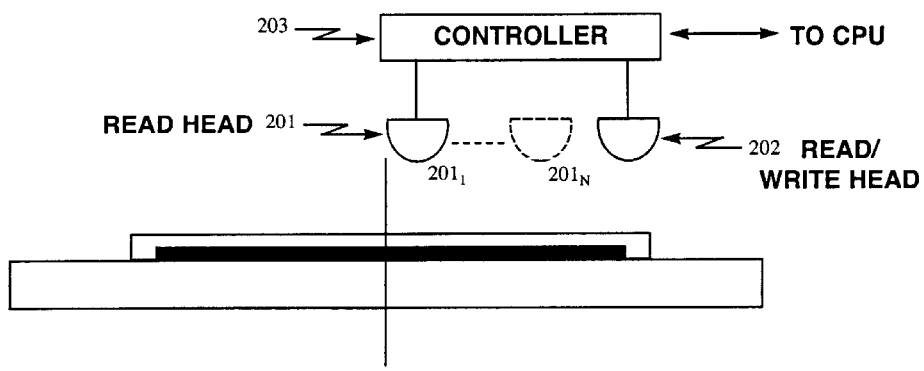
FIG. 2 is an illustrative of the relative position of the elements of a first embodiment of the disk drive apparatus in accordance with the present invention.

FIG. 2 shows the relative position of the elements of a first embodiment of the disk drive apparatus 200 in accordance with the present invention for optical disk 100 shown in FIGS. 1A and 1B. A conventional high density optical read head 201 is used containing, for example, a semiconductor laser to provide incident light for reading and a detector to detect the information recorded in read only part 101 and generate a corresponding read signal as an output. Optical read head 201 is controllably movable in a straight radial line from position $201_1$ at which it reads the information recorded in track $101_1$ to position $201_N$ at which it reads the information recorded in track $101_N$. Read head 201 is also of course controllable by controller 203 so as to be positionable at positions corresponding respectively to each one of said tracks $101_1$ to $101_N$.

A conventional magnetic read/write head 202 is provided to read, write, erase and change information at the track(s) of read/write part 102. Preferably, read/write part 102 is composed of a single circular track, in which case read/write head 202 is a very simple fixed-position read/write head and is not movable in the radial direction. Even if read/write part 102 is composed of several tracks, the control circuitry and/or mechanism for read/write head 202 is different than that for read head 201. For example, magnetic read/write head 202 is controllably lowered to a position immediately adjacent the disk when reading, writing, erasing or changing information in the track(s) of read/write part 102 and lifted out away from the disk the rest of the time, thereby saving wear and tear on the disk and the head.

The embodiment of disk 100 and disk drive device 200 shown in FIGS. 1A, 1B and 2 is but one of several different possible embodiments of the invention. For example, magnetic read/write part 102 may be located at any area of disk 100, such as the central portion, which is not used to record information in the read-only part according to a standard format. Furthermore, although read/write head 202 is preferably stationary in the radial direction, it may be movable away from the disk 100 in situations where a track of read-only part 101 is so close to a track of read/write part to possibly cause collision of the heads otherwise and thereby permit full access of read head 201 to all of the tracks $101_1$ to $101_N$.

In addition, the read/write part 102 may be an optical part in which information is written, read, erased and changed optically. In such an embodiment, it is preferable that the same high density optical head be used for both read-only part 101 and read/write part 102 recording information optically. In such a case, the optical head uses a laser system emits two different beams—one being used just for reading and the other being used just for writing.

Figure 3:
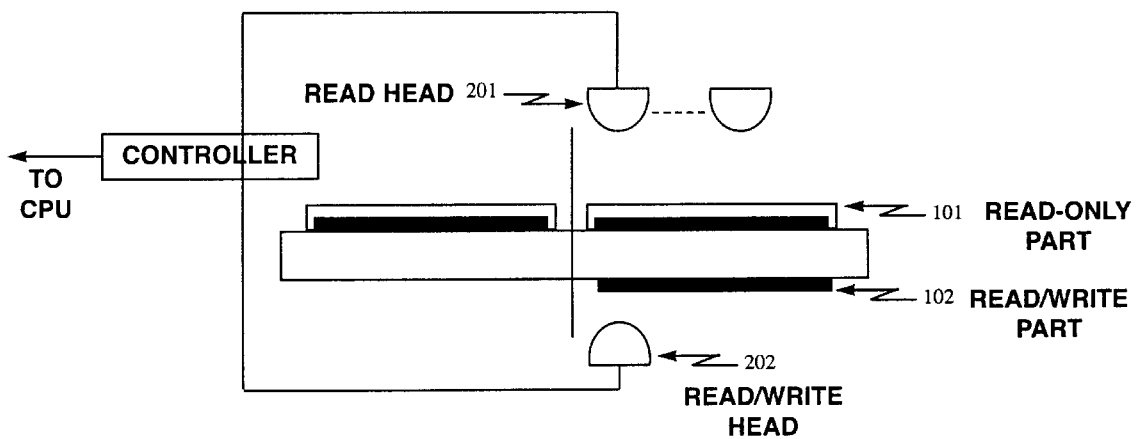
FIG. 3 is an illustration of the relative position of the elements of a second embodiment of the disk drive apparatus in accordance with the present invention.

As a further alternative, read/write part 102 may be on an area on the opposite side of disk 100 from the side of disk 100 containing the area for read-only part 101. In such an embodiment, read head 201 is located adjacent an opposite side of disk 100 than read/write head 202. Both read head 201 and read/write head 202 are thus movable in the radial direction as shown in FIG. 3 in order to be controllably positioned by controller 203 at each one of the tracks of read-only part 101 and read/write part 102. This embodiment is especially useful in applications in which it is desired to provide a large read/write part. For example, the read/write part could be used to store updates to a reference CD-ROM. Original information could be pre-recorded on read-only part 101 and then periodically updated with the supplemental information stored in read/write part 102. Such information could be downloaded to the CD-ROM through an information processing system such as a computer shown in FIG. 4.

Figure 4:
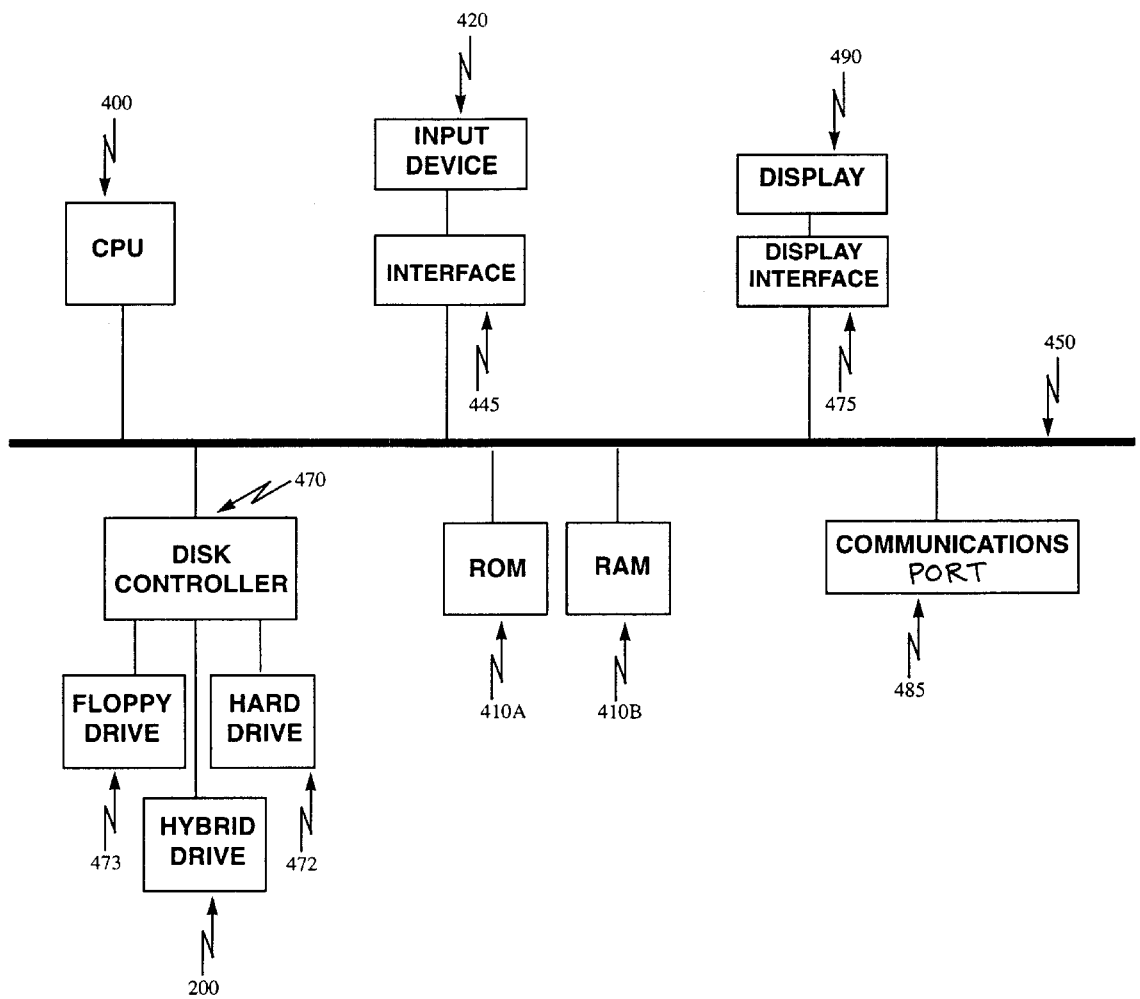
FIG. 4 is a block diagram of one embodiment of an information processing system in accordance with the present invention.

As shown in FIG. 4, the computer has a central processing unit (CPU) 400 operatively connected to memory devices 410A and 410B, namely read-only memory (ROM) 410$a$ and random access memory (RAM) 410$b$. ROM memory 410$a$ typically stores BIOS and operating system like information. Programming which instructs the CPU 400 to operate in accordance with the present invention as will be described in detail below may be stored in ROM or RAM. Data and information received or generated by the CPU 400 can be preferably stored in RAM 410$b$. Memory devices such as hard drive 472 or floppy disk drive 473, SRAM, DRAM, etc., could be utilized in addition to the hybrid disk drive 200 for a hybrid optical disk recording medium, as is well understood by those of skill in the art. The CPU 400 is also operatively connected to input device 420 which could be a key pad, key board, dial or virtually any other device which would facilitate the input of data, of the type described below, to the CPU 400 by a user.

The information processing system may alternatively constitute a CD player, DVD player, or computer which is different than the computer shown in FIG. 4, although the system must have bidirectional data transfer capabilities through a disk controller 470 or similar element. It is also to be understood that the elements of the system must be programmed to perform a variety of different operations. In particular, CPU 400 can be programmed to implement different methods of using read/write part 102 in conjunction with the reading of information pre-recorded in read-only part 101.

Figure 5:
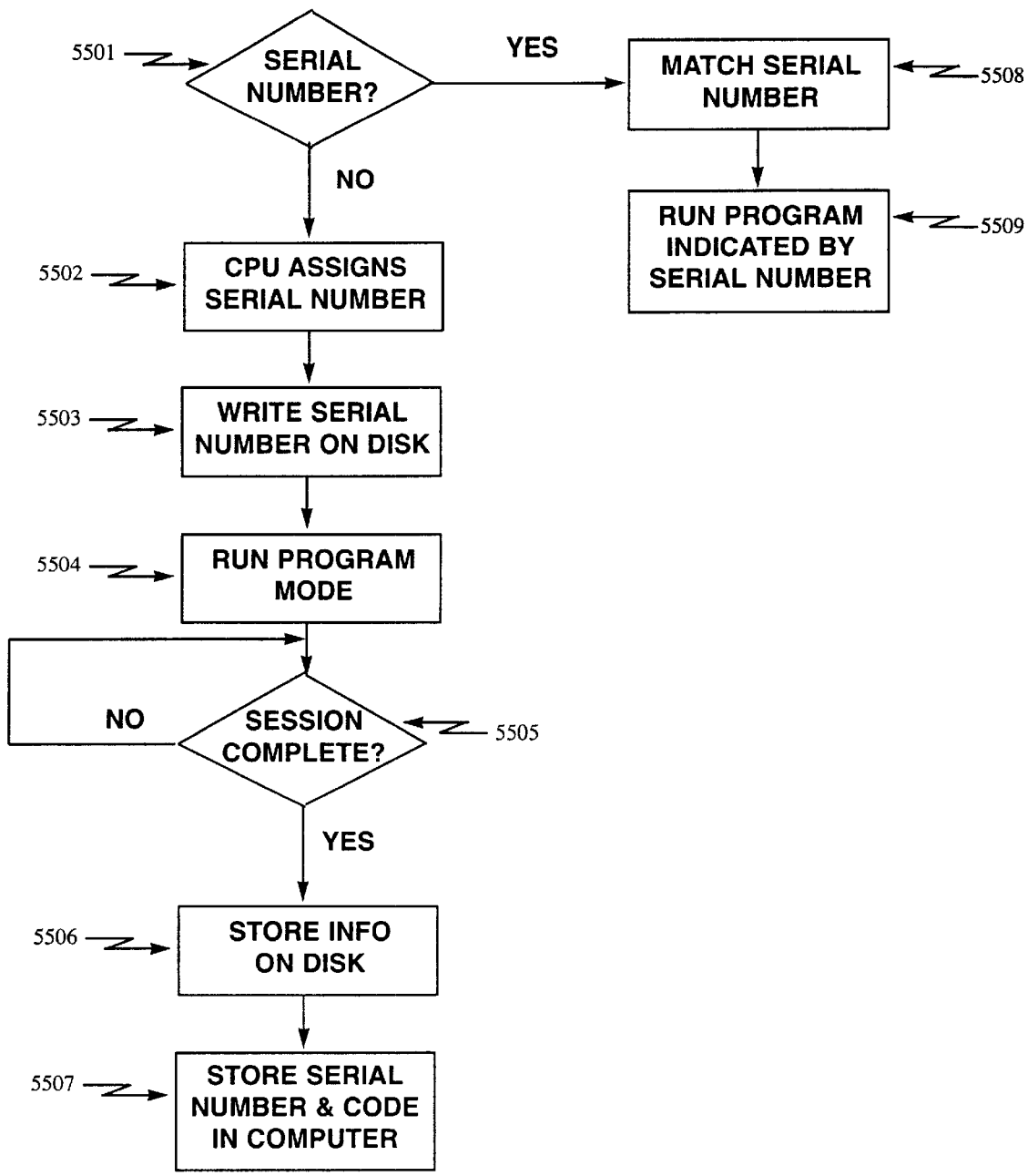
FIG. 5 is a flowchart of a method carried out by the information processing system shown in FIG. 4.

For example, CPU 400 can be programmed to perform the method shown in FIG. 5 of assigning serial or code numbers to different disks and using the serial numbers to identify a disk and implement a customized routine in conjunction with the reading of information pre-recorded in the read-only part 101 of the disk. In step S501, whenever a disk is received in the disk drive 200, it is read to determine if it is a hybrid disk and, if so, whether a read/write part 102 thereof contains an serial number identifying the disk. If the disk is a hybrid disk having no serial number in read/write part 102, then it is assigned a serial number by CPU 400 (step S502) and the serial number is written into read/write part 102 of the disk (step S503).

Thereafter, the information processing system enters a program mode (step S504) where it accepts and retains inputs from a user or other information indicating a preferred customization for the reading of information pre-recorded in the read-only part 101 of the disk. These inputs could indicate, for example, a preferred playback program for a series of song recorded in read-only part 101 of a hybrid CD or the preferred settings of equipment used in a home theater surround sound system to reproduce video and audio of a movie recorded in the read-only part of a hybrid DVD. Alternatively, the system could constantly monitor the reading of information from the read-only part 101 of the hybrid disk and maintain the last position of a user in the information (the information can be a video, song, game position, etc., as well as text). The program code continues and the inputs or monitored information is kept in RAM 410B until it is detected in step S505 that the disk session is completed (user discontinues uses or turns power off, etc.). When the session is complete, CPU 400 then causes the inputs or monitored information to be transferred from RAM 410B to read/write part 102 of disk 100 (step S506) and the serial number of the disk and corresponding control information to be kept in RAM 410B of the information processing system (step S507). In the examples given, the user's preferred playback program, electronic bookmark, game status, etc. are stored in read/write part 102.

When the disk is subsequently inserted into the disk drive 200, it will again be scanned and this time the serial number will be detected and read from read/write part 102. The serial number will be matched with the record thereof and the corresponding control information kept in RAM 410B (step S508). The control information is used as an index to identify the category of the disk and the format of the inputs or information stored in the read/write part thereof. For example, the control information can indicate that the disk is a CD and the inputs stored in the read/write part thereof indicate a playback program or that the disk is a CD-ROM game and the information stored in the read/write part thereof is indicative of the ending game position. The information processing system then carries out the program or otherwise performs steps in accordance with the control information corresponding to the serial number and the information in the read/write part of the hybrid disk.

Another example of a program performed by the CPU 400 in the information processing system using read/write part 102 in conjunction with the reading of information pre-recorded in read-only part 101 are the storage of keys for unlocking purchase songs from a collection of songs, videos, etc. from a large capacity hybrid disk. Another method could be use the read/write part 102 as keys for unlocking fonts or applications. The read/write part 102 could also be used to record the process or speed of a user, such as a student, reading the pre-recorded information in the read-only part 101 of the hybrid disks. Of course, there may be numerous methods which may be implemented by an information processing system by using the read/write part of the hybrid disk according to this invention.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. A hybrid optical disk recording medium, comprising:

a first sealed area having information recorded on a first recording medium in accordance with a standard format, said first area being finished and sealed in a manufacturing process, wherein the standard format is selected from a standard CD format, a standard DVD format, and a standard CD-ROM format; and a second area, not within said first sealed area, having a second recording medium separate from said first recording medium prepared to have information written thereto, read or erased therefrom and/or changed by a disk drive device.

2. A hybrid optical disk recording medium according to claim 1, wherein said first area is on a first side of said hybrid optical disk recording medium and said second area is on a second side of said hybrid optical disk recording medium.

3. A hybrid optical disk recording medium according to claim 1, wherein said first area comprises a plurality of circumferential tracks and said second area comprises a single circumferential track.

4. A hybrid optical disk recording medium according to claim 3, wherein said single circumferential track is located near the outside edge of said hybrid optical disk recording medium.

5. A hybrid optical disk recording medium according to claim 1, wherein said second area comprises magnetic material deposited on the surface of a standard format optical disk.

* * * * *